United States Patent
Hirsch et al.

(10) Patent No.: US 8,339,972 B2
(45) Date of Patent: Dec. 25, 2012

(54) METHOD AND SYSTEM FOR MONITORING A GTP COMMUNICATION PATH IN AN UMTS/GPRS NETWORK

(75) Inventors: Christian Hirsch, Zirndorf (DE); Frank Maerz, Schnaittach (DE)

(73) Assignee: Deutsche Telekom AG, Bonn (DE)

( * ) Notice: Subject to any disclaimer, the term of this patent is extended or adjusted under 35 U.S.C. 154(b) by 365 days.

(21) Appl. No.: 12/616,678

(22) Filed: Nov. 11, 2009

(65) Prior Publication Data

US 2010/0118724 A1  May 13, 2010

Related U.S. Application Data

(63) Continuation of application No. PCT/EP2008/003600, filed on May 6, 2008.

(30) Foreign Application Priority Data

May 11, 2007 (DE) .......................... 10 2007 022 066

(51) Int. Cl.
 H04J 1/16 (2006.01)
(52) U.S. Cl. ....................................................... 370/248
(58) Field of Classification Search .......... 370/235–253, 370/351–392
 See application file for complete search history.

(56) References Cited

U.S. PATENT DOCUMENTS

| | | | |
|---|---|---|---|
| 2002/0065904 A1* | 5/2002 | Hartman et al. ............... | 709/220 |
| 2002/0156878 A1* | 10/2002 | Conrad et al. ................. | 709/223 |
| 2003/0128672 A1* | 7/2003 | Komandur et al. ........... | 370/315 |
| 2004/0142688 A1* | 7/2004 | Remy ........................... | 455/423 |
| 2004/0258012 A1* | 12/2004 | Ishii ............................. | 370/328 |
| 2005/0005207 A1* | 1/2005 | Herneque .................... | 714/712 |
| 2005/0041581 A1* | 2/2005 | Kuusinen et al. ............. | 370/230 |
| 2005/0201371 A1* | 9/2005 | Lauer ........................... | 370/389 |
| 2006/0072479 A1* | 4/2006 | Loyd ............................ | 370/254 |
| 2006/0159025 A1 | 7/2006 | Abdo et al. | |

FOREIGN PATENT DOCUMENTS

WO  0251181 A1  6/2002

OTHER PUBLICATIONS

"Testing the UMTS Iu Interface," Tektronix, Inc., 2000 edition (13 pages).
International Search Report (Oct. 28, 2008, 3 pages).

* cited by examiner

Primary Examiner — Andrew Lai
Assistant Examiner — Juvena Loo
(74) Attorney, Agent, or Firm — The Maxham Firm

(57) ABSTRACT

A method for monitoring a GTP communication path in an UMTS/GPRS network as well as a corresponding monitoring system that is connected to the UMTS/GPRS network. The monitoring system comprises means for generating a GTP-C message in the form of a GTP echo request message containing an IP address of the monitoring system as an originating address and an IP address of a node of the UMTS/GPRS network or an external network as a destination address. The system also includes means for transmitting the GTP echo request message to the addressed network node and storing the message transmission time, means of receiving a GTP echo response message sent by the addressed network node as a reply to a successfully transmitted GTP echo request message, and means for determining a round trip time of the GTP echo request/response messages by forming the difference between the time the GTP echo response message is received and the time the GTP echo request message is sent.

4 Claims, 1 Drawing Sheet

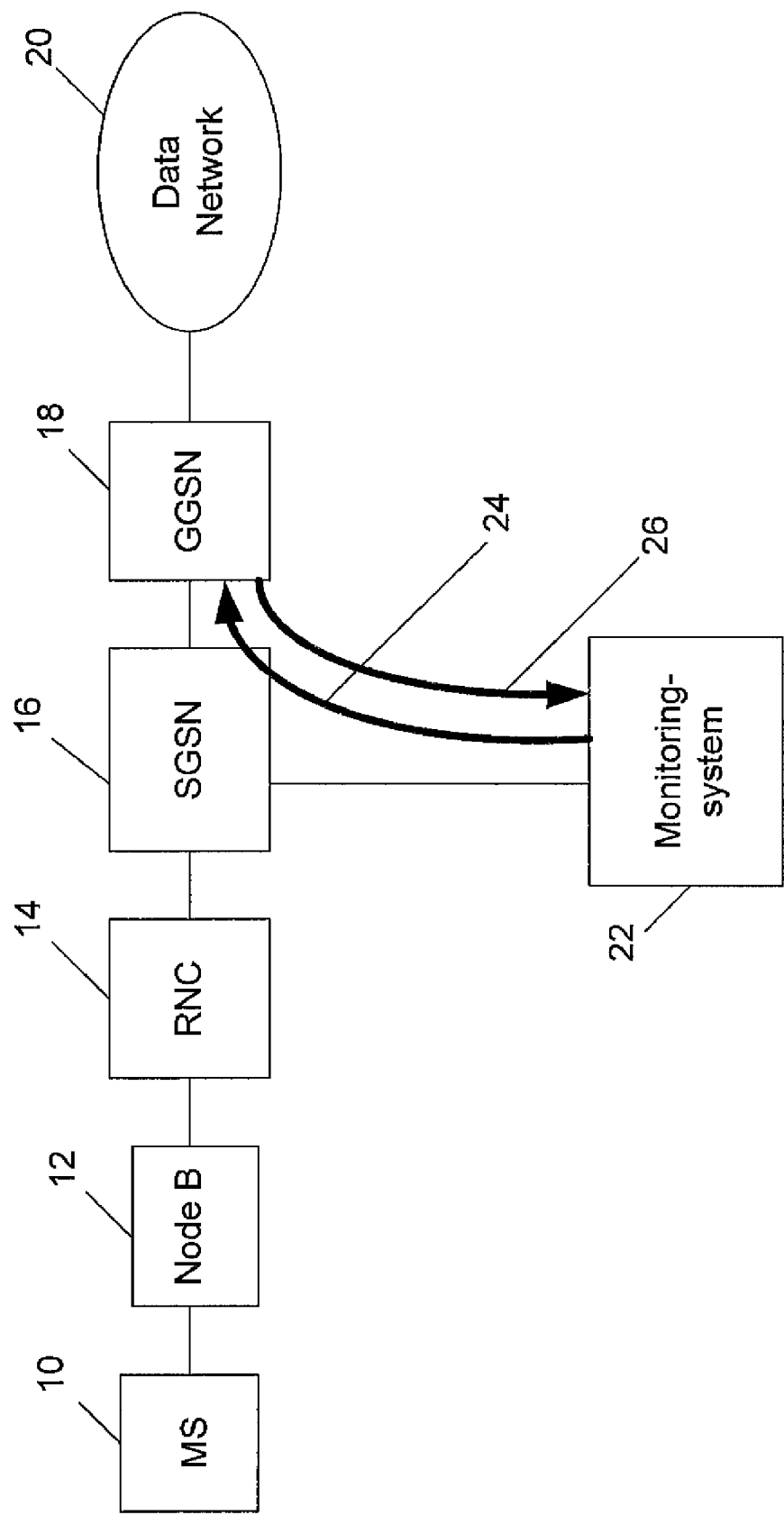

US 8,339,972 B2

METHOD AND SYSTEM FOR MONITORING A GTP COMMUNICATION PATH IN AN UMTS/GPRS NETWORK

FIELD OF THE INVENTION

The invention relates to a method for monitoring a GTP communication path in a UMTS/GPRS network and to a system for accomplishing the method.

DISCUSSION OF THE PRIOR ART

The GPRS Tunneling Protocol, abbreviated GTP, is an IP-based protocol that is used within GSM and UMTS networks. The GTP tunnels so-called packet data units by means of the
GPRS backbone network, and overrides the User Datagram Protocol, abbreviated UDP. GTP fundamentally comprises three separate protocols, GTP-C, GTP-U, and GRP'. GTP-C is used within the GPRS backbone network for signaling purposes between GPRS network nodes, for example, SGSN or GGSN. GTP-U is used as a carrier for user data within the GPRS network and between the wireless access network and the core networks. GTP' is used as a carrier for billing data in the GPRS network, among other things.

The GTP protocol is specified in greater detail in the specification 3GPP TS 29.060. The monitoring functions in the network are maintained, as described above, by means of GTP-C monitoring messages that are exchanged between the network nodes. The status of the communication paths between the network nodes can also be monitored and checked by means of GTP-C messages. For this purpose, a network node transmits a so-called GTP echo request message to another network node, which acknowledges this message with a GTP echo response message. The GTP echo function in the GTP is comparable with the PING function according to the ICMP protocol. GTP echo is a PING within the GTP protocol. The GTP echo messages are only transmitted by network elements that are direct participants in a communication. In particular, the network nodes transmit GTP echo messages only to other network nodes with which an open communication path, that is, PDB context, exists or existed. If a GTP echo request message is not acknowledged with a GTP echo response message, then the communication path has been interrupted. If the transmitting network node receives a GTP echo response message as an acknowledgement, it can determine the round trip time, which represents the time between transmission of a data packet and reception of an acknowledgement.

In general, a predetermined limit value is defined for the round trip time, with a disruption of the communication path being assumed if this limit value is exceeded. Up to now, permanent checking of the availability of network nodes, that is, communication paths in UMTS/GPRS networks, has not existed, since the GTP echo messages are transmitted only when a communication connection is active. Therefore, up to now, parameters such as the round trip time could not be measured actively, particularly not for just any network node. Many previously known monitoring systems merely passively analyze the network traffic that is occurring over the communication path.

US patent publication 2006/0159025 A1 discloses a method for determining the network performance of an IP network by determining the round trip time between two network elements.

A monitoring message is sent by one network element to the other network element, and the latter responds with a response message. The round trip time can be determined from the time between reception of the response message and transmission of the monitoring message. However, the messages and protocols described cannot be used for determining the round trip time in a UMTS/GPRS network.

SUMMARY OF THE INVENTION

It is a purpose of the invention to provide a method for monitoring a GTP communication path in a UMTS/GPRS network, which allows permanent monitoring of the availability of network nodes within the communication network.

Embodiments of the invention disclose a method for monitoring a GTP communication path in a UMTS/GPRS network, which comprises the following steps:

generating a GTP-C message in the form of a GTP echo request message in a monitoring system connected with a particular node of the UMTS/GPRS network, where the GTP echo request message contains an IP address of the monitoring system as the originating address and an IP address of another node of the UMTS/GPRS network or an external network as the destination address;

with the monitoring system, transmitting the GTP echo request message directly to the addressed other network node independently of whether a conduction path in a PDB context between the particular node and the addressed other network node is open or active and storing the time of transmission of the request message in a memory in the monitoring system;

receiving in the monitoring system directly from the addressed other network node, if transmission of the GTP echo request message is successful, a GPT-C message in the form of a GTP echo response message transmitted by the addressed other network node, where the GTP echo response message contains the IP address of the addressed other network node as the originating address and the IP address of the monitoring system as the destination address;

determining a round trip time of the GTP echo request/ response messages by forming the difference between the time of reception of the GTP echo response message and transmission of the GTP echo request message by the monitoring system;

storing the correspondingresults of the round trip time of individual test runs in memory in the monitoring system for later evaluation; and generating an error message by the monitoring system if the measured round trip time reaches or exceeds a predetermined limit value.

An advantage of embodiments of the invention lies in that network elements of the UMTS/GPRS network and also network elements of the roaming partners can be actively addressed with the GTP echo method, by means of the monitoring system, and checked at regular intervals. In particular, the round trip time can be measured at any desired time, that is, at regular intervals, and used as a quality indicator of the communication path. In this way, errors in backbone communication, for example also firewall or router problems, can be recognized very quickly.

In one embodiment of the invention, an error message can be generated by the monitoring system if the measured round trip time reaches or exceeds a predetermined limit value. The GTP echo method in accordance with the invention is therefore used as a quality indicator of the communication network.

A monitoring system is used in embodiments of the invention that transmits a GTP message in accordance with the specification 3GPP 29.060, based on a data processing program, to a network element of the GPRS backbone network. This is the GTP-C function "GTP echo request." This function checks whether the communication path to the addressed network node is functioning, in that the monitoring system waits for an acknowledgement from the addressed network node, in the form of a GTP echo response message. The round trip time between transmission and reception of the GTP echo messages is measured in the monitoring system, and permits conclusions concerning the quality of the communication path.

BRIEF DESCRIPTION OF THE DRAWING

Embodiments of the invention, as well as their features and advantages, are explained in more detail below based on the drawing showing only one way of carrying out the invention, in which:

FIG. 1 schematically shows an embodiment of a system for monitoring a GTP communication path in a UMTS/GPRS network in accordance with the invention.

DETAILED DESCRIPTION OF EMBODIMENTS OF THE INVENTION

Part of a UMTS/GPRS network and monitoring system 22 connected with it are shown as a schematic block diagram in FIG. 1. The communication system comprises mobile station 10 (MS), which can be a mobile phone, for example. Mobile station 10 is connected with node B 12, in other words, a fixed wireless station of the network. Node B ensures the connection between mobile station 10 and the rest of the network. Node B 12 is controlled by radio network controller 14 (RNC), preferably a wireless network controller, which coordinates the operation of the node 13 or a plurality of nodes B. RNC 14 is connected with serving GPRS support node 16 (SGSN). SGSN 16 is a GPRS network node that functions as a telephone switch and switches the data traffic from and to RNC 14 and other points of the network. The SGSN is connected with gateway GPRS support node 18 (GGSN), which represents the GPRS gateway network node. GGSN 18 functions as a gateway to other data networks 20, for example, the Internet. Of course, a UMTS/GPRS network may include a plurality of MS, nodes B, RNC, SGSN, GGSN elements or systems, with only one such network element being represented here as an example.

According to embodiments of the invention, a new type of monitoring system 22 is connected with a network node, for example, SGSN 16. The monitoring system comprises a data processing device with corresponding memory possibilities, for example, as well as a computer readable storage medium containing computer executable program instructions for causing the data processing device to allow data communication with the UMTS/GPRS network. The computer readable storage medium also contains computer executable program instructions for causing the data processing device to carry out the method of the invention. The monitoring system can also be part of an SGSN or another network node.

According to embodiments of the invention shown and described here, the availability of network nodes and communication paths in the network can be permanently checked by means of monitoring system 22.

For this purpose, the monitoring system comprises suitable means for generating a GTP-C message in the form of a GTP echo request message 24. The generated GTP echo request message 24 contains, among other things, the IP address assigned to monitoring system 22 as the originating address, and an IP address assigned to the network node to be checked as a destination address. Any desired network nodes and network elements of the network that support the GTP echo method, for example RCN, SGSN, GGSN, or network nodes of an external data network, can be checked by means of monitoring system 22. For this purpose, a list of the IP addresses of the network nodes and network elements to be checked can be stored in the monitoring system, that is, in a memory of the monitoring system, from which list the destination addresses for the test are selected.

Monitoring system 22, furthermore, comprises means for transmitting the generated GTP echo request message 24 to the addressed network node, here, for example, network node GGSN 18. The time of transmission of the GTP echo request message 24 is stored in memory in the monitoring system.

GTP echo request message 24 is transmitted by monitoring system 22, by way of SGSN 16, to addressed GGSN 18 and received there. If the GTP echo request message 24 was properly received in GGSN 18, then a GTP-C message in the form of a GTP echo response message 26 is generated in GGSN 18, as standard procedure. GTP response message 26 contains the IP address of the network node, GGSN 18, as the originating address, and the IP address of monitoring system 22 that transmitted the GTP echo request message 24 as the destination address. This GPT echo response message 26 is transmitted to the addressed monitoring system 22 by GGSN 18. The monitoring system comprises means for receiving GTP echo response message 26, where the reception of the GTP echo response message is provided with a time stamp for recording the time of reception of this message.

Monitoring system 22 now determines a round trip time for the transmitted and received GTP echo request/response messages 24, 26. The round trip time is determined by forming the difference between the time of reception of GTP echo response message 26 and the time of transmission of GTP echo request message 24 by monitoring system 22. Generally, a predetermined limit value for the round trip time is established in the communication system. The monitoring system can now generate an error message if the round trip time measured using the GTP echo method reaches or exceeds the predetermined limit value. If GGSN 18 does not respond to GTP echo request 24 at all, then it can be assumed that a failure of the communication connection or of GGSN 18 has occurred. The corresponding results of the round trip time of the individual test runs can be stored in memory in monitoring system 22, for later evaluation. Of course, this GTP echo test can be carried out not only for GGSN 18 but also for other network nodes and network elements, for example, RNC 14, SGSN 16, or network elements of external data network 20.

What is claimed is:

1. A method for monitoring a GPRS Tunnelling Protocol (GTP) communication path in a UMTS/GPRS network, the method comprising:

generating a GTP-C message in the form of a GTP echo request message in a monitoring system connected with a particular node of the UMTS/GPRS network, where the GTP echo request message contains an IP address of the monitoring system as the originating address and an IP address of another node of the UMTS/GPRS network or an external network as the destination address;

with the monitoring system, transmitting the GTP echo request message directly to the addressed other network node independently of whether a conduction path between the particular node and the addressed other network node is open or active and storing the time of transmission of the request message in a memory in the monitoring system;

receiving in the monitoring system directly from the addressed other network node, if transmission of the GTP echo request message is successful, a GPT-C message in the form of a GTP echo response message transmitted by the addressed other network node, where the GTP echo response message contains the IP address of the addressed other network node as the originating address and the IP address of the monitoring system as the destination address;

determining a round trip time of the GTP echo request/response messages by forming the difference between the time of reception of the GTP echo response message and transmission of the GTP echo request message by the monitoring system;

storing the corresponding results of the round trip time of individual test runs in memory in the monitoring system for later evaluation; and generating an error message by the monitoring system if the measured round trip time reaches or exceeds a predetermined limit value.

2. A nontransitory computer readable storage medium containing computer executable program instructions for causing a data processing unit of a system for monitoring a GTP communication path in a UMTS/GPRS network to carry out the method according to claim 1.

3. A monitoring system for monitoring a GPRS Tunnelling Protocol (GTP) communication path in a UMTS/GPRS network when the monitoring system is connected with a particular node of the UMTS/GPRS network, the system comprising:

means for generating a GTPC-message in the form of a GTP echo request message, where the GTP echo request message contains an IP address of the monitoring system as the originating address and an IP address of another network node of the UMTS/GPRS network or an external network as the destination address;

means for transmitting the GTP echo request message directly to the addressed other network node independently of whether a conduction path between the particular node and the addressed other network node is open or active and for storing the time of transmission of the request message;

means for receiving directly from the addressed other node, a GTP echo response message transmitted by the addressed other network node as a response to the transmitted GTP echo request message;

means for determining a round trip time of the GTP echo request/response messages by forming the difference between the time of reception of the GTP echo response message and transmission of the GTP echo request message;

means for storing the corresponding results of the round trip time of individual test runs in memory in the monitoring system for later evaluation; and means for generating an error message if the measured round trip time reaches or exceeds a predetermined limit value.

4. A nontransitory computer readable storage medium containing computer executable program instructions for causing a data processing device to allow data communication with a UMTS/GPRS network according to the method of claim 1.

* * * * *